US012031522B2

(12) United States Patent
Mulders et al.

(10) Patent No.: US 12,031,522 B2
(45) Date of Patent: Jul. 9, 2024

(54) CONTROLLING A WIND TURBINE WITH A SCALED POWER COEFFICIENT

(71) Applicant: VESTAS WIND SYSTEMS A/S, Aarhus N (DK)

(72) Inventors: Sebastiaan Mulders, Rotterdam (NL); Fabio Spagnolo, Aarhus C (DK); Jesper Sandberg Thomsen, Hadsten (DK); Julio Xavier Vianna Neto, Skødstrup (DK); Jan-Willem Van Wingerden, Barendrecht (NL); Livia Brandetti, Delft (NL)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/499,397

(22) Filed: Nov. 1, 2023

(65) Prior Publication Data

US 2024/0159216 A1    May 16, 2024

(30) Foreign Application Priority Data

Nov. 4, 2022  (EP) ..................................... 22205531

(51) Int. Cl.
*F03D 7/02* (2006.01)
*F03D 1/00* (2006.01)
*F03D 7/04* (2006.01)

(52) U.S. Cl.
CPC ............. *F03D 7/0224* (2013.01); *F03D 1/00* (2013.01); *F03D 7/042* (2013.01);
(Continued)

(58) Field of Classification Search
CPC .......... F03D 1/00; F03D 7/0224; F03D 7/042; F05B 2220/30; F05B 2270/101; F05B 2270/32

See application file for complete search history.

(56) References Cited

U.S. PATENT DOCUMENTS 9,816,487 B2 * 11/2017 Govind .................. F03D 80/88
2015/0159626 A1 * 6/2015 Tarnowski ................ F03D 7/04
290/44

(Continued)

FOREIGN PATENT DOCUMENTS

EP    3088733 A1    11/2016

OTHER PUBLICATIONS

European Patent Office, extended European Search Report for Application 22205531.1-1002 dated Apr. 4, 2023.

(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

The present invention relates to controlling a wind turbine with a scaled power coefficient where the scaled power coefficient is determined in an adjustment process. In particular is disclosed control of a wind turbine in a partial load operation mode based on a tip-speed ratio (TSR) tracking scheme which based on an estimated wind speed determines a power setpoint. The disclosed adjustment process comprises setting a scaled power coefficient as a predetermined power coefficient multiplied by a scaling factor; adding a time-varying perturbation signal to the power setpoint; determining a transfer function from the perturbation signal to a power error; evaluate the frequency response of the transfer function over a time period to determine the scaling factor which minimizes the gain of the transfer function; and setting the operating power coefficient as the scaled power coefficient.

15 Claims, 4 Drawing Sheets

(52) U.S. Cl.
CPC ..... *F05B 2220/30* (2013.01); *F05B 2270/101* (2013.01); *F05B 2270/32* (2013.01)

(56) References Cited

U.S. PATENT DOCUMENTS

| | | | |
|---|---|---|---|
| 2015/0226183 A1* | 8/2015 | Esbensen | F03D 7/0276 290/44 |
| 2016/0177924 A1* | 6/2016 | Xue | H02J 3/381 290/44 |
| 2016/0201652 A1* | 7/2016 | Govind | F03D 1/0658 416/210 A |

OTHER PUBLICATIONS

Van Baars G E et al., "Closed loop system indentification of an industrial wind turbine system: experiment design and first validation results," Decision and Control, 1994., Proceedings of The 33rd IEEE Conference, vol. 1, dated: Dec. 14, 1994, pp. 625-630.

Mohsen Nourbakhsh Soltani et al., "Estimation of Rotor Effective Wind Speed: A Comparision," IEEE Transactions on Control Systems Technology, IEEE Service Center, vol. 21, No. 4, Dated: Jul. 1, 2013, pp. 1155-1167.

\* cited by examiner

CONTROLLING A WIND TURBINE WITH A SCALED POWER COEFFICIENT

FIELD OF THE INVENTION

The present invention relates to controlling a wind turbine with a scaled power coefficient where the scaled power coefficient is determined in an adjustment process.

BACKGROUND OF THE INVENTION

Modern wind turbines are controlled and regulated continuously to ensure optimal power extraction from the wind under the current wind while at the same time ensuring that the loads on the different components of the wind turbine are at any time kept within acceptable limits and while respecting any externally set operational constraints. Based on this and following some control strategy, the turbine's control parameters are determined to perform optimally under the given conditions.

Optimal performance requires that the turbine components perform as intended in accordance with the design. Wind turbines are subject to atmospheric conditions throughout their lifetime. A hostile environment irreversibly damages the aerodynamic properties of the blades, this being the case with, e.g. leading edge erosion. Or reversibly, for instance, when ice builds up, or sand is deposited on the blades. Despite the nature of degradation, energy production (AEP) loss is expected if neither the blade shape nor the roughness is the designed one, and the turbine controller is not aware of the change.

A common control scheme of a wind turbine in a partial load operation mode is based on a tip-speed ratio (TSR) tracking scheme, which, based on the estimation of the rotor-effective wind speed, determines a power setpoint. Such a control scheme, as well as many other wind turbine control features, relies on a nominal or predetermined power coefficient ($C_p$). If the actual $C_p$ coefficient does not match the nominal or predetermined power coefficient, wrong pitch and tip-speed-ratio setpoints are selected, leading to sub-optimal operations.

The wind is generally measured downwind by an anemometer, leading to a measurement disturbed by the rotating rotor. Consequently, more reliable control may be obtained using a wind speed estimator as an input control scheme. A common type of wind speed estimator is based on a power or torque balance between the aerodynamic power or torque of the rotor and the electrical power or torque of the generator. Such wind speed estimator may include an internal model which is sensitive to the actual power coefficient.

It is against this background that the invention has been devised.

SUMMARY OF THE INVENTION

It would be advantageous to ensure that a wind turbine is controlled in accordance with a power coefficient which reflects actual conditions rather than nominal conditions. In particular, it would be beneficial to provide a manner of adjusting the power coefficient to better reflect the actual power coefficient in a situation where there is a mismatch between the predetermined power coefficient and the actual power coefficient.

Accordingly, in a first aspect, there is provided a method of controlling a wind turbine in a partial load operation mode based on a tip-speed ratio (TSR) tracking scheme, which, based on an estimated wind speed, determines a power setpoint, the estimated wind speed being determined based on a power or torque balance between the aerodynamic power or torque of the rotor and the electrical power or torque of the generator, wherein the TSR tracking scheme ensures operation in accordance with an operating power coefficient, and wherein the operating power coefficient has been adjusted in an adjustment process. The adjustment process comprises:

setting a scaled power coefficient as a predetermined power coefficient multiplied by a scaling factor,
adding a time-varying perturbation signal to the power setpoint;
determining a transfer function from the perturbation signal to a power error, the power error being determined as the difference between an operating rotor power and an estimated rotor power,
evaluate the frequency response of the transfer function over a time period to determine the scaling factor which minimizes the gain of the transfer function;
setting the operating power coefficient as the scaled power coefficient.

This method is advantageous for providing an algorithm with adjusts (or calibrates) the operating power coefficient without the need for wind speed measurements. The adjustment process is also referred to as a learning process as the adjustment process comprises a number of steps with the effect that the actual power coefficient of the wind turbines is learned, or at least learns an actual power coefficient which better matches the actual power coefficient of the wind turbines, as compared to the predetermined power coefficient. The method provides an adjustment process which relies on a scaled power coefficient and a transfer function from a perturbation signal to a power error. During an evaluation process, a time-varying perturbation signal is added to the power setpoint, and the frequency response of the transfer function is evaluated over a time period to determine the scaling factor. The scaling factor is determined to be the scaling factor which minimizes the gain of the transfer function.

The inventors of the present invention have realized that a convex transfer function can be defined based on non-linear differential equations of the wind turbine and wind speed estimator dynamics. It has been realized that by evaluating the frequency response of the power estimation error for different levels of multiplicative uncertainty in the $C_p$ model (i.e. for different scaled power coefficients), the transfer function gain minimizes when the internal controller model matches the real turbine best. Thereby providing a scaled power coefficient which matches the operating turbine better than the predetermined (or design) power coefficient.

The time-varying perturbation signal comprises an excitation frequency, and the frequency response may be evaluated by varying the excitation frequency. The time-varying perturbation signal may be a single sinusoid at the excitation frequency.

A power error is determined as the difference between an operating rotor power and an estimated rotor power. The operating rotor power may include a sum of the power setpoint and the power obtained from the rotor inertia. The estimated rotor power may be obtained from an internal model of the rotor power based on the scaled power coefficient.

The adjustment process is beneficially implemented as a closed-loop process.

The scaling factor is determined as the factor which minimizes the gain of the transfer function. The minimization of the gain of the transfer function may be done in a convex minimization of the difference between the derivative of the predetermined power coefficient and the derivative of the scaled power coefficient. The derivative being taken with respect to the tip-speed ratio and the estimated tip-speed ratio, respectively.

A power error is determined as the difference between an operating rotor power and an estimated rotor power. The power error may be demodulated and a numerically integration to determine the scaling factor.

The adjustment period may be performed during a time period between one and ten hours. The duration of the time period may be determined based on a turbulence intensity so that for low turbulence intensity, the time period is shorter than for high turbulence intensity.

The adjustment process may not be efficient in high turbulence conditions, and the adjustment process may be conditioned upon the turbulence intensity being below a predefined turbulence intensity level.

After the adjustment process, the wind turbine may be operated using the scaled power coefficient. In addition to the tip-speed ratio (TSR) tracking control in partial load operation mode further control elements may also rely on the power coefficient, and the wind turbine can beneficially be operated using the scaled power coefficient for more or even all controller elements using the power coefficient.

Application of the method of the present invention may also be used for turbine monitoring purposes. For example, by determining that a scaling of the operating power coefficient is needed without any realizable reason is an indication of fault of the turbine. For example, if the power coefficient has recently been changed by the method of the present invention and a new correction is needed, is likely an indication that a fault has occurred and a service inspection would be warranted.

In a further aspect there is provided a non-transient, computer-readable storage medium storing instructions thereon that when executed by one or more processors cause the one or more processors to execute a method according to the first aspect.

The method may be implemented as a computer program product, and the computer program product may be provided on the computer-readable storage medium or being downloadable from a communication network. The computer program product comprises instructions to cause a data processing system, e.g. in the form of a controller, to carry out the instruction when loaded onto the data processing system.

In a further aspect there is provided a controller for controlling a wind turbine in a partial load operation mode in accordance with the first aspect. In a yet further aspect there is provided a wind turbine comprising the controller.

In general, a controller may be a unit or collection of functional units which comprises one or more processors, input/output interface(s), and a memory capable of storing instructions that can be executed by a processor.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described by way of example only, with reference to the drawings, in which.

DESCRIPTION OF EMBODIMENTS

Figure 1:
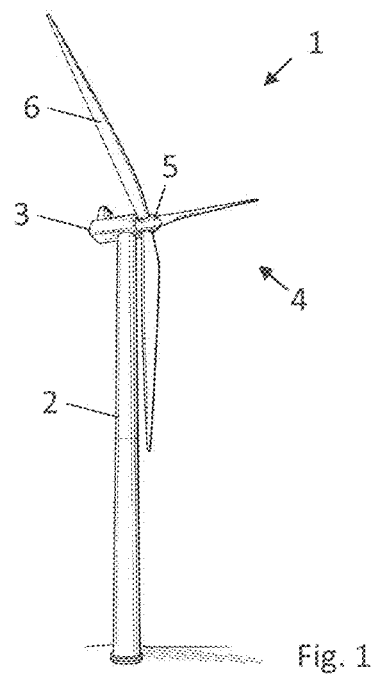
FIG. 1 illustrates, from a schematic perspective view, an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected.

Figure 2:
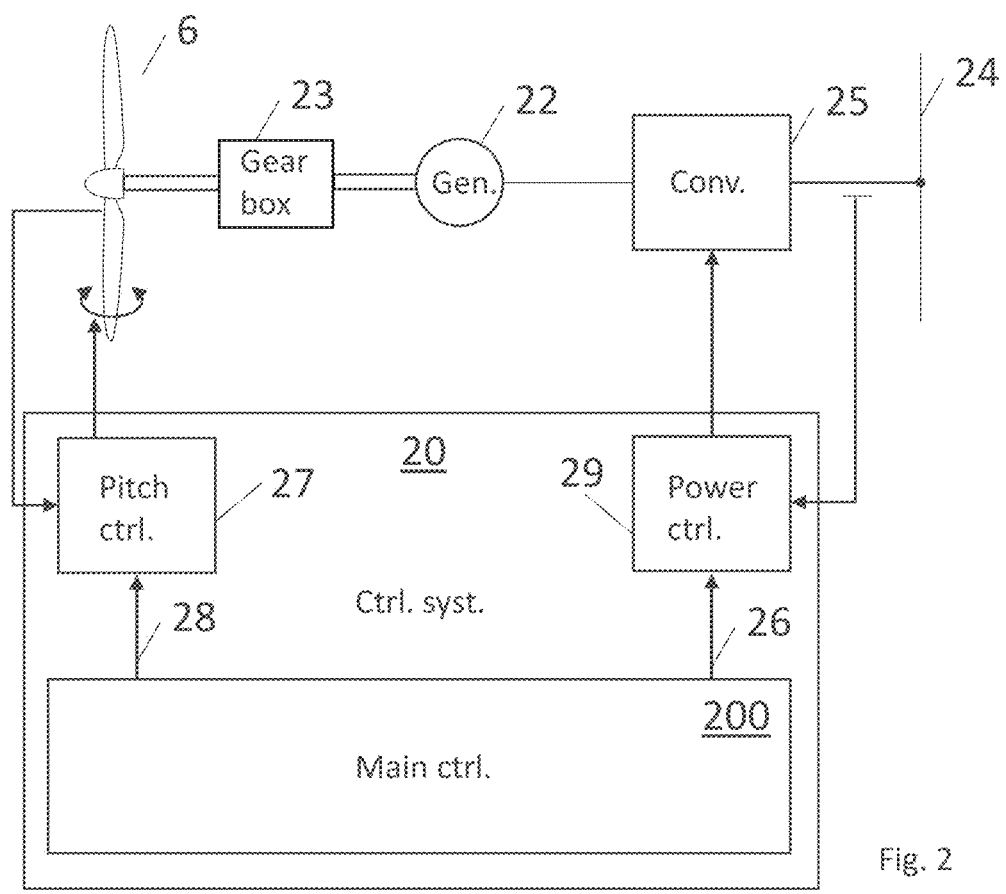
FIG. 2 schematically illustrates an embodiment of a control system together with elements of a wind turbine.

FIG. 2 schematically illustrates an embodiment of a control system 20 together with elements of a wind turbine. The wind turbine comprises rotor blades 6, which are mechanically connected to an electrical generator 22 via gearbox 23. In direct drive systems, and other systems, the gearbox may not be present. The electrical power generated by the generator 22 is injected into a power grid 24 via an electrical converter 25. The electrical generator 22 and the converter 25 may be based on a full-scale converter (FSC) architecture or a doubly fed induction generator (DFIG) architecture, but other types may be used.

The control system 20 comprises several elements, including at least one main controller 200 with a processor and memory so that the processor is capable of executing computing tasks based on instructions stored in the memory. In general, the wind turbine controller ensures that in operation the wind turbine generates a requested power output level. This is obtained by adjusting the pitch angle and/or the power extraction of the converter. To this end, the control system comprises a pitch system including a pitch controller 27 using a pitch reference 28 and a power system including a power controller 29 using a power reference 26.

The power controller controls the various electric components of the generator converter system to deliver the requested power, hereunder controls the torque of the generator that is needed to extract the requested power by the rotor from the wind.

Figure 3:
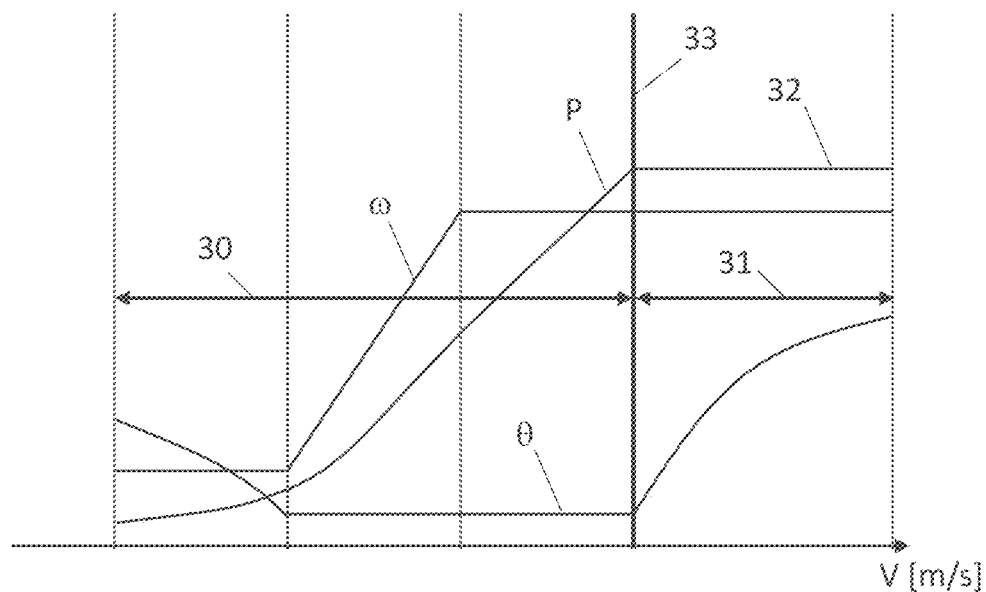
FIG. 3 illustrates a general control scheme divided into a partial load operation area and a full load operation area.

FIG. 3 illustrates a general control scheme divided into a partial load operation area 30 and a full load operation area 31. In partial load operation 30, the wind turbine controller may adjust the pitch (θ) of the blades to an optimal pitch angle, typically around zero degrees.

This ensures that while the wind turbine is not producing the maximum amount of electricity it is able to produce it is controlled to capture as much energy from the wind as it can. If there is sufficient energy in the wind (i.e. the wind speed is above the rated wind speed 33) the wind turbine will operate in full load operation 31 while generating rated power 32, and control of the wind turbine blade pitch is used to turn the blades out of the wind to avoid overspeed of the generator and/or unsafe operation of the turbine while keeping the rotor speed constant. The figure moreover shows rotor speed (w) and generated power (P).

While operating in the partial load region 30, the turbine may be controlled based on a tip-speed ratio (TSR) tracking scheme, which based on an estimated wind speed, determines a power setpoint P. The estimated wind speed being determined based on a power or torque balance between the aerodynamic power or torque of the rotor and the electrical power or torque of the generator. The TSR tracking scheme ensures operation in accordance with an operating power coefficient. It is important that the operating power coefficient closely matches the real power coefficient of the wind turbine. To ensure this, the operating power coefficient may be adjusted in an adjustment process in accordance with embodiments of the present invention.

Figure 4:
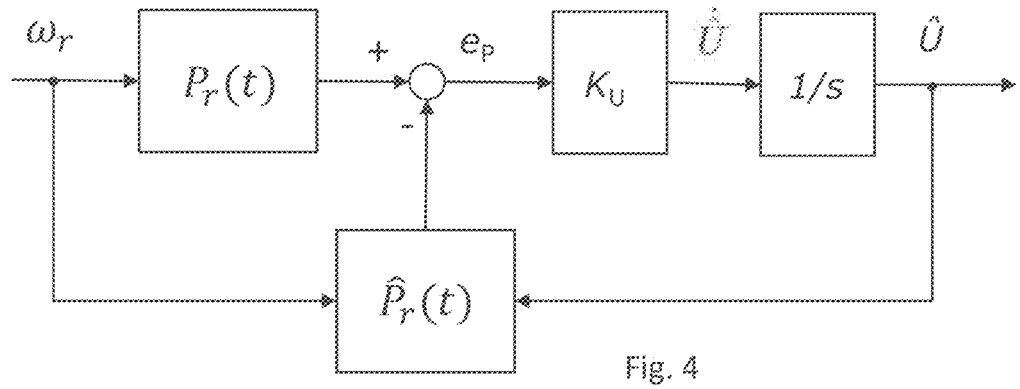
FIG. 4 illustrates in a schematic manner elements of a wind speed estimator.

FIG. 4 illustrates in a schematic manner elements of a wind speed estimator based on a power or torque balance between the aerodynamic power or torque of the rotor and the electrical power or torque of the generator.

The actual rotor speed ($\omega_r$) is measured by a rotor speed sensor and input into a computing block which determines the operating rotor power $P_r(t)$ as a sum of the power setpoint, $P_g$, and the power obtained from the rotor inertia. The operating rotor power is obtained from the power balance equation:

$$J\dot{\omega}_r(t)\omega_r(t) = P_r(t) - P_g(t)$$

Here shown without taking losses into account. It is within the abilities of the skilled person to include mechanical and electrical losses.

The operating rotor power $P_r(t)$ is compared to an estimated rotor power $\hat{P}_r(t)$ obtained from an internal model based on an estimated power coefficient, determined as:

$$\hat{P}_r = \frac{1}{2}\rho A \hat{U}^3 \hat{C}_P(\hat{\lambda}).$$

where $\hat{C}_p$ is the estimated power coefficient and $\hat{\lambda}$ is the estimated TSR:

$$\hat{\lambda} = \omega_r R / \hat{U}$$

with $\hat{U}$ being the estimated wind speed, that is the rotor-effective wind speed.

The estimated wind speed can be determined by the application of a proportional action as:

$$\dot{\hat{U}} = K_U e_P = K_U(P_g - \hat{P}_r + J\dot{\omega}_r\omega_r),$$

where $K_U$ is the estimator gain and $e_P$ is the power error being determined as the difference between an operating rotor power and an estimated rotor power. It is within the ability of the skilled person to solve this differential equation during the operation of the wind turbine to determine the estimated wind speed, $\hat{U}$.

Based on the estimated wind speed, the tip-speed ratio tracking control scheme may be implemented as a proportional-integral (PI) controller $$\dot{P}_g = K_p \dot{e}_\omega + K_i e_\omega$$

in which the error $e_\omega = r_\omega - \omega_r$ is the respective difference between the rotor speed and the time-varying rotor speed setpoint $r_\omega(t)$.

The adjustment process relies on the determination of a transfer function from a time-varying perturbation signal to a power error and the evaluation of the frequency response of the transfer function. In the following, to assist the skilled person, an example and the underlying math is provided. It is to be understood that other transfer functions and frequency evaluations may be made not relying on the exact mathematical approach provided.

In the adjustment process, a scaled power coefficient is set as a predetermined power coefficient multiplied with a scaling factor $\hat{C}_p = \gamma C_p$, with $\gamma$ being a scaling factor in the form of multiplicative model uncertainty, corresponding to an overall gain reduction of $C_p$, without changing the location of the optimal tip-speed-ratio and pitch. The predetermined power coefficient may be the design power coefficient or a power coefficient which have already been adjusted, e.g. in connection with an earlier process in accordance with the present invention or by another adjustment process.

With the time-varying perturbation signal and the transfer function being determined, the frequency response of the transfer function over a time period can be determined to determine the scaling factor, which minimizes the gain of the transfer function.

The operating power coefficient is set as the scaled power coefficient.

Transfer Function Determination and Frequency Response Evaluation

The frequency response evaluation can be obtained in accordance with the following example evaluation.

A wind turbine state is defined as $$x = [\omega_r, \hat{U}]^T$$

with the input $$u = [P_{g,e}, P_{g,c}]^T$$

consists of a respective excitation and controller power contribution, and the output is defined as $$y = [e_\omega, e_P]^T.$$

Thereby the following nonlinear state space system can be used:

$$\dot{x} = f(x, u) = \begin{bmatrix} 1/(J\omega_r)(P_r - P_g) \\ K_U(P_g - \hat{P}_r + J\dot{\omega}_r\omega_r) \end{bmatrix}, \quad y = g(x, u) = \begin{bmatrix} e_\omega \\ e_P \end{bmatrix}.$$

Linearizing the above-given equations by taking the Jacobian with respect to the state, input and output vectors results in $$A = \begin{bmatrix} (T + P_g/\omega_r^2)/J & 0 \\ K_U(Q - \hat{Q}) & -K_U V \end{bmatrix},$$

-continued $$B = \frac{-1}{J\overline{\omega}_r}\begin{bmatrix} 1 & 1 \\ 0 & 0 \end{bmatrix}, C = \begin{bmatrix} 1 & -\lambda^*/R \\ (Q-\hat{Q}) & -V \end{bmatrix}, D = O.$$

where $Q=\partial P_r/\partial\omega_r$, $\hat{Q}=\partial\hat{P}_r/\partial\omega_r$, $T=\partial\sigma_r/\partial\omega_r$, and $V=\partial\hat{P}_r/\partial\hat{U}$ A unique transfer function representation of the state-space system is obtained using $C(sI-A)^{-1}B+D$, resulting in $$G(s) = \begin{bmatrix} G_{1,1}(s) & G_{1,2}(s) \\ G_{2,1}(s) & G_{2,2}(s) \end{bmatrix} = \begin{bmatrix} G_1(s) & G_1(s) \\ G_2(s) & G_2(s) \end{bmatrix},$$

where s is the Laplace operator, and $$G_1(s) = \frac{-1}{J\overline{\omega}_r}\left(\frac{s+K_U(V-\lambda^*/R(Q-\hat{Q}))}{(s-(T+\dot{P}_g/\overline{\omega}_r^2)/J)(s+K_UV)}\right),$$

$$G_2(s) = \frac{-1}{J\overline{\omega}_r}\left(\frac{(Q-\hat{Q})s}{(s-(T+\dot{P}_g/\overline{\omega}_r^2)/J)(s+K_UV)}\right).$$

By defining the transfer function for the PI controller as $$C(s) = \frac{P_{g,c}(s)}{E_\omega(s)} = \frac{K_p s + K_i}{s},$$

and in series with $G_1(s)$, one obtains the loop transfer $$L_1(s) = G_1(s)C(s) = = \frac{-1}{J\overline{\omega}_r}\frac{(K_p s+K_1)(s+K_U(V-\lambda^*/R(Q-\hat{Q})))}{s(s-(T+P_g/\overline{\omega}_r^2)/J)(s+K_UV)},$$

and by closing the loop around the loop transfer in- and output $e_\omega$, the following single-input single-output (SISO) transfer function is obtained $$H(s) = \frac{E_P(s)}{\mathcal{P}_{g,e}(s)} = \frac{G_2(s)}{1-L_1(s)} = \frac{-(Q-\hat{Q})s^2}{J(\Xi_1+\Xi_2)},$$

in which $$\Xi_1 = \overline{\omega}_r s(s-(T+\overline{P}_g/\overline{\omega}_r^2)(s+K_UV)$$

and $$\Xi_2 = (1/J)(K_p s+K_i)(s+K_U(V-\lambda^*/R(Q-\hat{Q})))$$

are used to make the expression more compact.

The closed-loop transfer function H(s) possesses a DC gain term as the difference between the actual and estimated partial derivative of the rotor power with respect to the rotor speed (respectively indicated by Q and $\hat{Q}$). The difference between those terms and, in turn, the magnitude of the frequency response of H(s) nullify whenever the turbine model information matches with the actual aerodynamic properties. Furthermore, the sign of the transfer flips whenever degradation is under- or overestimated. The transfer function is convex, which is further elaborated on in the following.

The partial derivative represented by is defined as $$\frac{\partial P_r}{\partial\omega_r} = \frac{1}{2}\rho A R U^2 \frac{\partial C_P}{\partial\lambda},$$

and a similar expression is obtained for its estimate $\hat{Q}$. Taking the difference term, one obtains the following relation $$\frac{\partial P_r}{\partial\omega_r} - \frac{\partial\hat{P}_r}{\partial\omega_r} = \frac{1}{2}\rho AR\left(U^3\frac{\partial C_P}{\partial\lambda} - \hat{U}^3\frac{\partial\hat{C}_P}{\partial\hat{\lambda}}\right).$$

Which nullifies whenever $$U^3\frac{\partial C_P}{\partial\lambda} = \hat{U}^3\frac{\partial\hat{C}_P}{\partial\hat{\lambda}}.$$

An adjustment process can be set up where these two terms are equated and thereby minimizing the transfer H(s).

A convex minimization problem may be defined so that the minimization of the gain of the transfer function is done in a convex minimization of the difference between the derivative of the predetermined power coefficient and the derivative of the scaled power coefficient.

$$\underset{\hat{C}_P,\partial\hat{C}_P/\partial\lambda}{\mathrm{argmin}}\left|\frac{1}{C_P(\lambda)}\frac{\partial C_P}{\partial\lambda}(\lambda) - \frac{1}{\hat{C}_P(\hat{\lambda})}\frac{\partial\hat{C}_P}{\partial\hat{\lambda}}(\hat{\lambda})\right|.$$

The first term consists out of characteristic turbine properties as a function of the turbine operational state and environmental conditions, whereas the second term contains corresponding modelled and estimated representations.

To solve the minimization problem, one can either calibrate the modelled power coefficient information, its gradient, or a combination of both. Therefore, in its current form, the minimization is underdetermined, and one may take into account the following additional observations in solving the minimization problem:

1) The problem can be minimized by taking the power coefficient gradient as a decision variable, which does not have an effect on the correctness of the estimated rotor effective wind speed.
2) Setting the tip-speed ratio reference to track the maximum power coefficient results in an estimated power coefficient gradient being equal to 0. This will make the considered equality underdetermined, meaning that an infinite number of solutions exist.

The estimated degradation function may be defined as a multiplication between an a priori known degradation profile $\gamma(\hat{\lambda})$ and its unknown scaling factor $\alpha$.

Frequency Response Evaluation and the Adjustment Process

The adjustment process may be implemented as a learning algorithm taking the convex dynamic properties of the turbine control scheme into account. An important advantage is that there is no need for a wind speed measurement. One goal of the algorithm is to correct the wind speed estimator internal model in terms of the power coefficient information.

Embodiments of the present invention have been simulated on the NREL 5-MW reference wind turbine. Simulations obtained on the NREL reference wind turbine is known and available to the skilled person. The NREL reference wind turbine is for example described in the Technical Report NREL/TP-500-38060 from February 2009 by J. Jonkman, S. Butterfield, W. Musial, and G. Scot entitled "Definition of a 5-MW Reference Wind Turbine for Offshore System Development".

Using NREL 5-MW reference wind turbine, the effect of model uncertainty on H(s) may be exemplified. For the purposes of the learning algorithm, the turbine operates at a nonoptimal TSR setpoint of $\bar{\lambda}^*=9.5$, whereas the controller and estimator gains are set constant for all operating conditions at $K_P=4.57 \cdot 10^5$, $K_i=4.57 \cdot 10^4$, and $K_U=1.67 \cdot 10^{-7}$. The degradation function is analyzed for the set of constant multiplicative factors $\Gamma=\{0.85, 0.95, 0.99, 1.2\}$, where $\Gamma$ is the Laplace representation of $\gamma$. The resulting steady-state operating points are obtained for each uncertainty level and are used for the evaluation of H(s).

Figure 5:
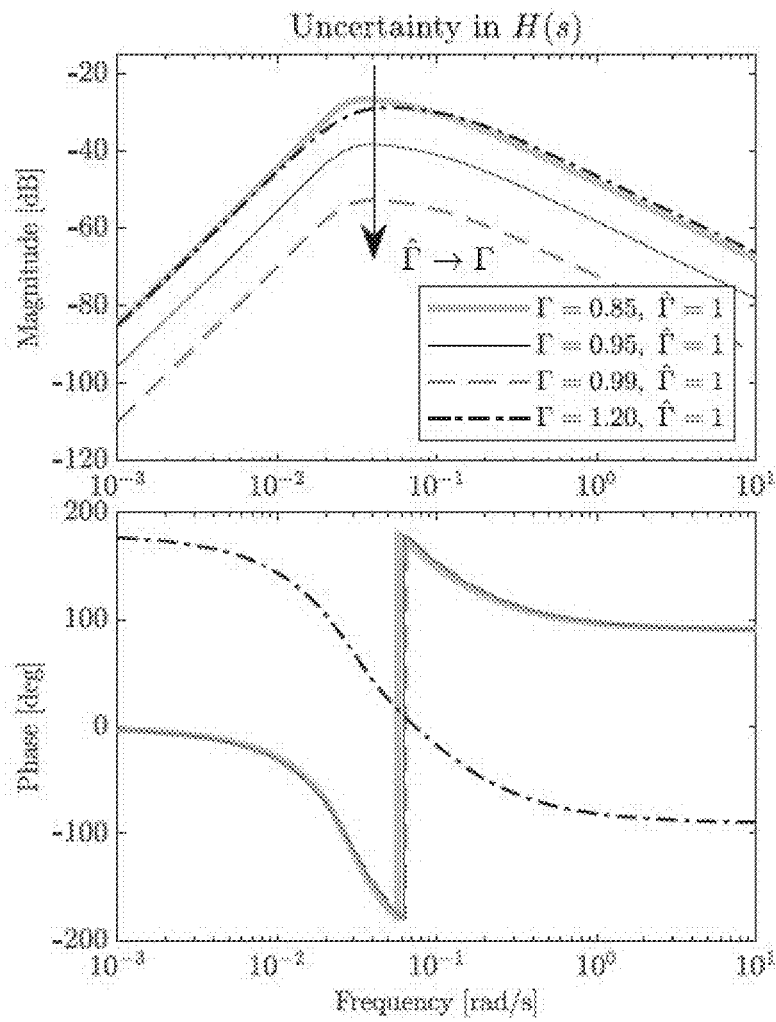
FIG. 5 illustrates a Bode plot of an example transfer function.

FIG. 5 illustrates a Bode plot of the transfer function H(s) from the perturbation signal to a power error evaluated at the above-given uncertainty levels.

FIG. 5 illustrates a Bode plot of H(s) for the set of $\Gamma$, with $\hat{\Gamma}=1$ for all cases. It is shown that the magnitude response diminishes for $\hat{\Gamma} \rightarrow \Gamma$. Also, as shown in the phase plot, the sign of the transfer changes whenever the degradation function is under or overestimated, and the maximum magnitude response frequency depends on specific operating conditions, rotor structural properties and controller gains. All these properties are beneficial for the development and convergence properties of the learning scheme.

The time-varying perturbation signal comprises an excitation frequency, and the frequency response is evaluated by varying the excitation frequency. The power error may be demodulated and numerically integrated to determine the scaling factor.

Figure 6:
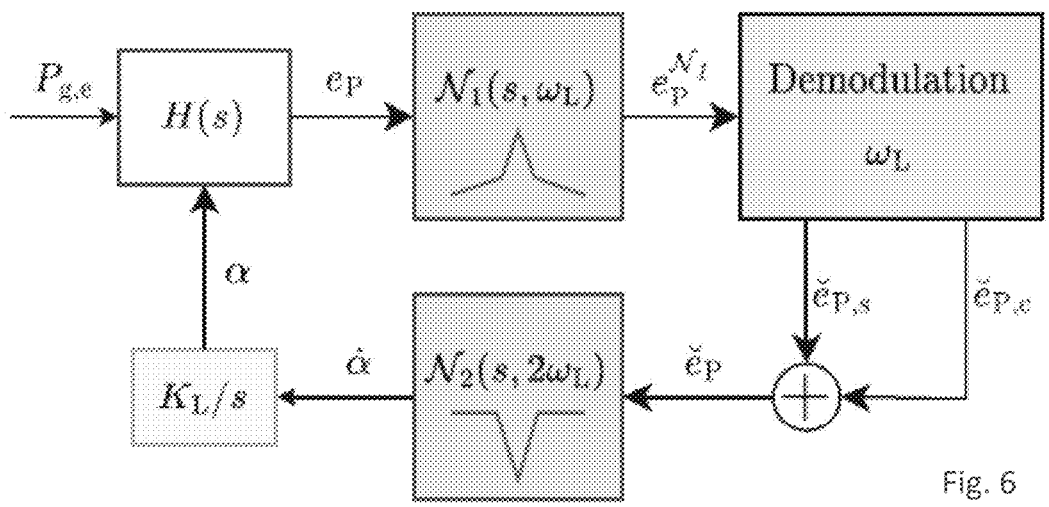
FIG. 6 illustrates a block diagram of an adjustment process.

FIG. 6 illustrates a block diagram of an adjustment process in the form of a learning scheme to minimize a periodic excitation signal present in the output $e_P$ in the form of an excitation-demodulation based learning approach. The scheme shows that by periodically exciting $P_{g,e}$ with a single sinusoid at frequency $\omega_L$, the output signal $e_P$ is subsequently filtered, demodulated and numerically integrated. The result after integration is $\alpha$ to scale the a priori known degradation profile $\gamma(\hat{\lambda})$. Whenever an a is found such that $\Gamma(\lambda)=\hat{\Gamma}(\hat{\lambda})$, the gain of H(s) nullifies.

The closed-loop system H(s) is excited with the single-frequency periodic signal $$P_{g,e}(t)=A_P \sin(\omega_L t),$$

where $A_P$ and $\omega_L$ are the excitation amplitude and frequency, respectively. From the linear system theory, it follows that the output is a magnitude-scaled and phase-shifted version of the excitation signal, such that $$e_P(t)=A_e \sin(\omega_L t+\psi_H),$$

where $A_e=A_P|H(j\omega_L)|$ being the output amplitude of the resulting excitation signal, with a phase shift representing the phase loss in the system at the excitation frequency.

Next, the system response at the excitation frequency is isolated using the following (inverted) notch filter with +1/−1 slopes to the left and right side of its natural frequency:

$$\mathcal{N}_1(s, \omega_L) = \frac{E_P(s)}{E_P^{\mathcal{N}_1}(s)} = K\frac{s}{s^2+2\zeta_1\omega_L s+\omega_L^2}.$$

in which $\zeta_1$ is the damping ratio, and the gain $K=2\zeta\omega_L$ for a unity gain at the fundamental frequency of the filter. The resulting time-domain output signal is $$e_P^{\mathcal{N}_1}(t) = A_c \sin(\omega_L t+\psi_{HN}),$$

and is subsequently subject to a signal demodulation operation to transfer the frequency response content at $\omega_L$ to a static DC contribution. In the time domain, demodulation comes down to the following operation $$\breve{e}_P(t) = e_P^{\mathcal{N}_1}(t)(\sin(\omega_L t+\psi_D)+\cos(\omega_L t+\psi_D)), =$$
$$\frac{A_e}{2}+\frac{A_e}{2}(\sin(2(\omega_L t+\psi_D))-\cos(2(\omega_L t+\psi_D))),$$

and the above-given derivation only holds when $\psi_D=\psi_{HN}$, where $\psi_D$ is a phase-offset tuning variable to compensate for the phase loss $\psi_{HN}$ caused by dynamic operations and system delays. The correct tuning of $\psi_D$ increases the convergence performance. The resulting signal $\breve{e}_P$ now consists out of a linear combination of a steady-state offset $A_e/2$ with a periodic contribution at $2\omega_L$. This signal, subject to a notch filter at $2\omega_L$, is given by $$\mathcal{N}_2(s, 2\omega_L) = \frac{\mathcal{A}(s)}{\tilde{E}_P(s)} = \frac{s^2+2\zeta_2(2\omega_L)s+(2\omega_L)^2}{s^2+2\zeta_3(2\omega_L)s+(2\omega_L)^2},$$

where A(s) is the Laplace representation of the time-domain signal $\alpha$, and $\zeta_2$, $\zeta_3$ are the respective numerator and denominator damping coefficients. Lastly, the magnitude scaling of the degradation profile is numerically integrated $$\alpha(t)=K_L \int \dot{\alpha}(t)dt.$$

The scaling factor $\alpha$ is a direct calibration parameter into the nonlinear closed-loop system to the estimated degradation function. Because of the convex and sign-altering properties of the transfer function, the above-described learning scheme converges.

Thus an embodiment of the adjustment process has been provided.

Figure 7:
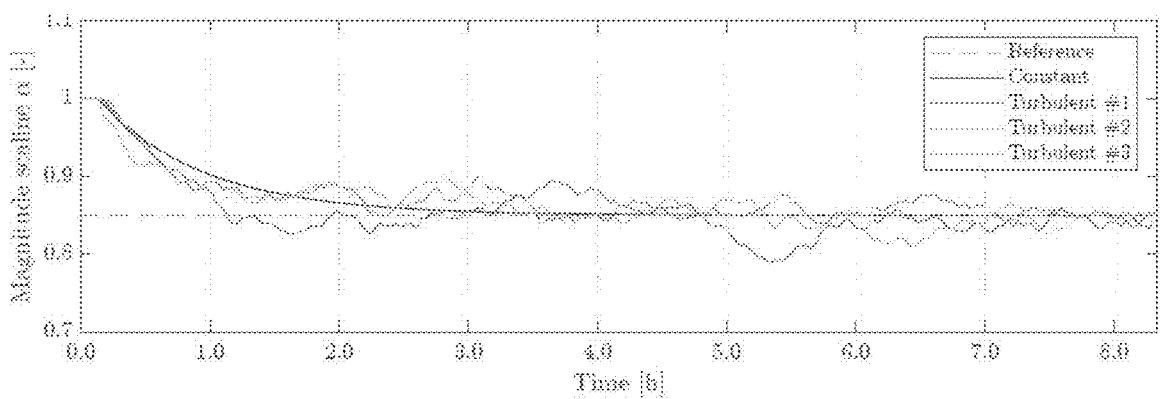
FIG. 7 shows a simulation for several runs of the adjustment progress for different wind profiles to obtain the scaling factor of the power coefficient.

FIG. 7 shows a simulation for several runs of the adjustment progress for different wind profiles to obtain the scaling factor of the power coefficient. The simulations are based on the NREL 5-MW reference turbine.

The adjustment or learning progress is illustrated for an actual aerodynamic performance constant-factor degradation scenario represented by $\Gamma=0.85$. The two learning scenarios considered are subject to a constant wind profile and three distinct realizations of realistic turbulent wind fields (TI=3%). The figure shows a reference for the estimated degradation function $\hat{\Gamma}=\alpha=0.85$ that is to be discovered by the scheme by the red dashed line. For the constant wind speed, the scheme is seen to converge to the exact degradation magnitude correction factor. For the turbulent cases, the algorithm is also shown to (on average) converge to the correct value. Although the simulations are run for an extended period of time to indicate convergence, the algorithm is seen to converge on a time scale of hours.

For the constant wind profile, the algorithm shows to accurately find the actual degradation factor, whereas for the different turbulent wind realizations the degradation magnitude is found correctly on average but is subject to variational uncertainty. It is also recognized that the speed of the algorithm is on the time scale of hours, which makes the learning scheme most suitable for learning long-term degradation scenarios such as leading-edge erosion.

Figure 8:
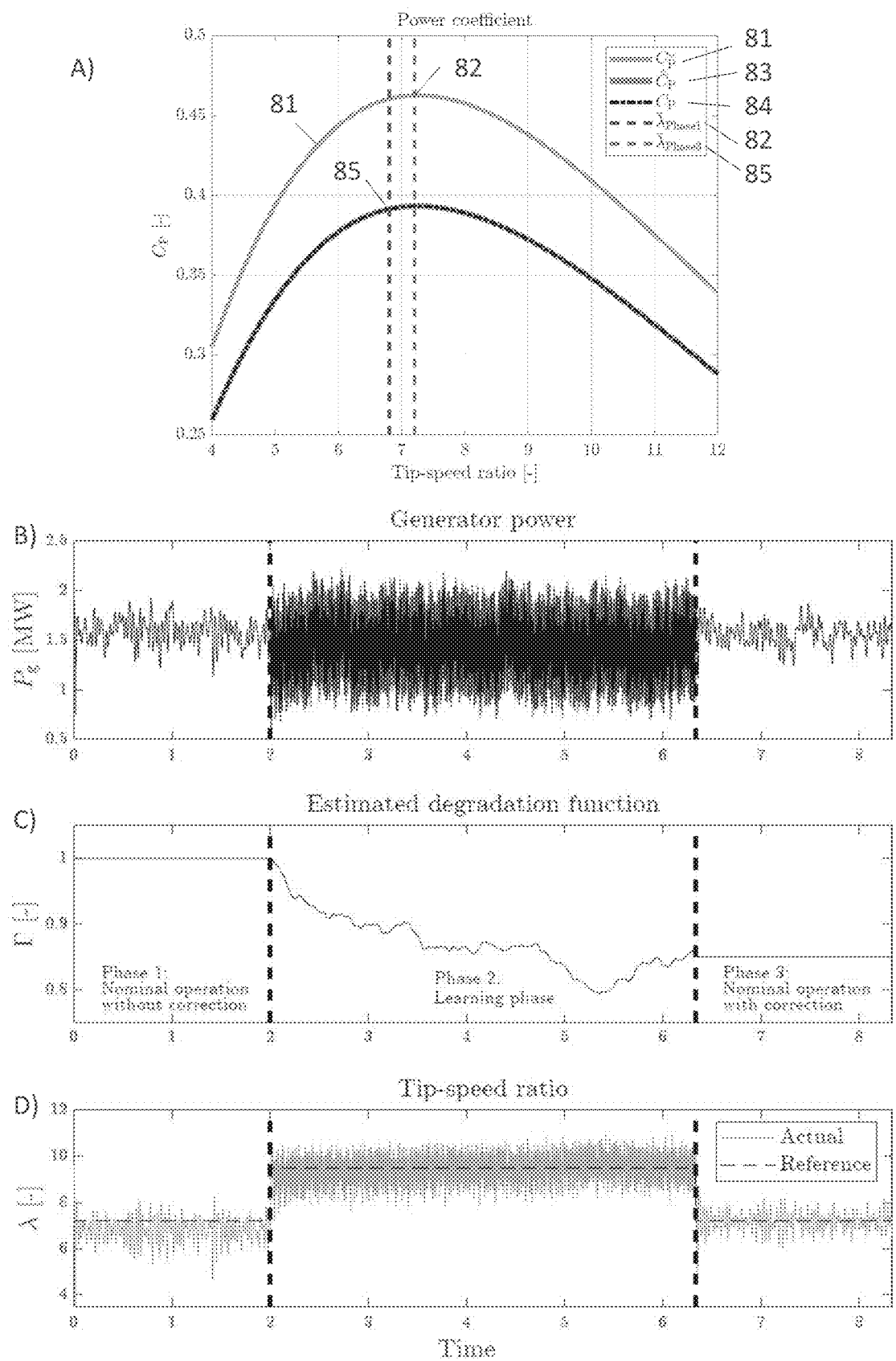
FIG. 8 illustrates simulations of generator power, scaling factor and tip-speed ratio for different power coefficients.

FIG. 8 illustrates simulations of generator power, scaling factor and tip-speed ratio for different power coefficients. The simulation is based on the based on the NREL 5-MW reference wind turbine using a low turbulence level of 3%.

FIG. 8A illustrates different power coefficients as function of tip-speed ratio. The power coefficient marked 81 is the predetermined or design power coefficient. The maximum of this power coefficient is marked with 82. Further the simulated actual power coefficient 83 is shown to be overlayed together with the resultant estimated power coefficient 84. The maximum of the resultant estimated power coefficient is marked with 85.

FIGS. 8B to 8D illustrate three subplots: turbine-generated power 8B, the learned correction factor of the algorithm 8C, and the tip-speed ratio (actual+controller reference) (TSR) 8D.

The total simulation time is 8 hours, split into 3 stages:
In the first 2 hours (phase 1), a nominal simulation for a degraded turbine with an uncorrected internal controller model is made.
For the next 4 hours (phase 2), the learning scheme is enabled to learn the uncertainty.
For the last 2 hours (phase 3), the determined value of the learned correction factor is implemented in a nominal simulation (without learning excitation).

As can be seen the maximum TSR is shifted leading to a different operation point of the wind turbine when operating in partial load. From FIG. 8A it can be seen that even though the TSR is shifted, the shift is at the flat part of the TSR curve and therefore the generated power is not affected much. This is clear from the comparison between the generated power in phase 1 and phase 3 on FIG. 8B.

Importantly, as can be seen on FIG. 8D, in phase 1 the actual TSR is in mean somewhat lower than the reference TSR. But after the learning phase, in phase 3, the actual TSR has converged to the TSR control reference. The turbine will after the adjustment process follow the intended control TSR reference. In this manner the mismatch between the design TSR and the actual TSR is removed leading to wind turbine which will operate closer to as expected and therefore more stable.

In the learning phase (phase 2), the TSR setpoint has been relocated to 9.5. By moving the TSR away from the flat part of the $C_p$ curve during the learning phase, the learning scheme will work better as otherwise the time-varying perturbation signal to the power setpoint will not have a large effect on the transfer function output.

Example embodiments of the invention have been described for the purposes of illustration only and not to limit the scope of the invention as defined in the accompanying claims.

The invention claimed is:

1. A method of controlling a wind turbine in a partial load operation mode based on a tip-speed ratio (TSR) tracking scheme which based on an estimated wind speed determines a power setpoint, the estimated wind speed being determined based on a power or torque balance between an aerodynamic power or torque of a rotor of the wind turbine and an electrical power or torque of a generator of the wind turbine, wherein the TSR tracking scheme ensures operation in accordance with an operating power coefficient, and wherein the operating power coefficient has been adjusted in an adjustment process,
the adjustment process comprises:
setting a scaled power coefficient as a predetermined power coefficient multiplied by a scaling factor;
adding a time-varying perturbation signal to the power setpoint;
determining a transfer function from the time-varying perturbation signal to a power error, the power error being determined as a difference between an operating rotor power and an estimated rotor power;
evaluating a frequency response of the transfer function over a time period to determine the scaling factor which minimizes a gain of the transfer function; and
setting the operating power coefficient as the scaled power coefficient.

2. The method according to claim 1, wherein the time-varying perturbation signal comprises an excitation frequency and wherein the frequency response is evaluated by varying the excitation frequency.

3. The method according to claim 2, wherein the time-varying perturbation signal is a single sinusoid at the excitation frequency.

4. The method according to claim 1, wherein the operating rotor power includes a sum of the power setpoint and the power obtained from inertia of the rotor.

5. The method according to claim 1, wherein the estimated rotor power is obtained from an internal model of power of the rotor based on the scaled power coefficient.

6. The method according to claim 1, wherein the adjustment process is a closed loop process.

7. The method according to claim 1, wherein minimization of the gain of the transfer function is done in a convex minimization of the difference between a derivative of the predetermined power coefficient and a derivative of the scale power coefficient.

8. The method according to claim 1, wherein power error is demodulated and numerically integrated to determine the scaling factor.

9. The method according to claim 1, wherein the time period is between one and ten hours.

10. The method according to claim 9, wherein the time period is determined based on a turbulence intensity so that for low turbulence intensity the time period is shorter than for high turbulence intensity.

11. The method according to claim 10, wherein the adjustment process is conditioned upon the turbulence intensity being below a predefined turbulence intensity level.

12. The method according to claim 1, wherein after the adjustment process the wind turbine is operated using the scaled power coefficient.

13. A non-transient, computer-readable storage medium storing instructions thereon that when executed by one or more processors cause the one or more processors to execute an operation of controlling a wind turbine in a partial load operation mode based on a tip-speed ratio (TSR) tracking scheme which based on an estimated wind speed determines a power setpoint, the estimated wind speed being determined based on a power or torque balance between an aerodynamic power or torque of a rotor of the wind turbine and an electrical power or torque of a generator of the wind turbine, wherein the TSR tracking scheme ensures operation in accordance with an operating power coefficient, and wherein the operating power coefficient has been adjusted in an adjustment process, the adjustment process comprising:
  setting a scaled power coefficient as a predetermined power coefficient multiplied by a scaling factor;
  adding a time-varying perturbation signal to the power setpoint;
  determining a transfer function from the time-varying perturbation signal to a power error, the power error being determined as a difference between an operating rotor power and an estimated rotor power,
  evaluating a frequency response of the transfer function over a time period to determine the scaling factor which minimizes a gain of the transfer function; and
  setting the operating power coefficient as the scaled power coefficient.

14. A controller for controlling a wind turbine in a partial load operation mode based on a tip-speed ratio (TSR) tracking scheme which, based on an estimated wind speed, determines a power setpoint, the estimated wind speed being determined based on a power or torque balance between an aerodynamic power or torque of a rotor of the wind turbine and an electrical power or torque of a generator of the wind turbine, wherein the TSR tracking scheme ensures operation in accordance with an operating power coefficient, and wherein the operating power coefficient has been adjusted in an adjustment process performed by the controller, the adjustment process comprising:
  setting a scaled power coefficient as a predetermined power coefficient multiplied by a scaling factor;
  adding a time-varying perturbation signal to the power setpoint;
  determining a transfer function from the time-varying perturbation signal to a power error, the power error being determined as a difference between an operating rotor power and an estimated rotor power,
  evaluating a frequency response of the transfer function over a time period to determine the scaling factor which minimizes a gain of the transfer function; and
  setting the operating power coefficient as the scaled power coefficient.

15. A wind turbine, comprising:
a rotor;
a generator; and
a controller for controlling the wind turbine in a partial load operation mode based on a tip-speed ratio (TSR) tracking scheme which, based on an estimated wind speed, determines a power setpoint, the estimated wind speed being determined based on a power or torque balance between an aerodynamic power or torque of the rotor and an electrical power or torque of the generator, wherein the TSR tracking scheme ensures operation in accordance with an operating power coefficient, and wherein the operating power coefficient has been adjusted in an adjustment process performed by the controller, the adjustment process comprising:
setting a scaled power coefficient as a predetermined power coefficient multiplied by a scaling factor;
adding a time-varying perturbation signal to the power setpoint;
determining a transfer function from the time-varying perturbation signal to a power error, the power error being determined as a difference between an operating rotor power and an estimated rotor power,
evaluating a frequency response of the transfer function over a time period to determine the scaling factor which minimizes a gain of the transfer function; and
setting the operating power coefficient as the scaled power coefficient.

* * * * *